US012768499B2

(12) United States Patent
Choi

(10) Patent No.: US 12,768,499 B2
(45) Date of Patent: Oct. 20, 2026

(54) FUEL REFUELING APPARATUS AND FUEL REFUELING TRANSMISSION METHOD

(71) Applicants: HYUNDAI MOTOR COMPANY, Seoul (KR); Kia Corporation, Seoul (KR)

(72) Inventor: Hae Pin Choi, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 2 days.

(21) Appl. No.: 18/946,808

(22) Filed: Nov. 13, 2024

(65) Prior Publication Data

US 2025/0155083 A1 May 15, 2025

(30) Foreign Application Priority Data

Dec. 13, 2023 (KR) ........................ 10-2023-0181250
Jan. 15, 2024 (KR) ........................ 10-2024-0006180

(51) Int. Cl.
*F17C 5/00* (2006.01)

(52) U.S. Cl.
CPC ........ *F17C 5/007* (2013.01); *F17C 2205/037* (2013.01); *F17C 2221/012* (2013.01); *F17C 2250/034* (2013.01); *F17C 2250/0478* (2013.01); *F17C 2265/065* (2013.01); *F17C 2270/0168* (2013.01); *F17C 2270/0184* (2013.01)

(58) Field of Classification Search
CPC ................ F17C 5/007; F17C 2205/037; F17C 2221/012; F17C 2250/034; F17C 2250/0478; F17C 2265/065; F17C 2270/0168; F17C 2270/0184; B67D 7/02; B67D 7/06; B67D 7/84
See application file for complete search history.

(56) References Cited

U.S. PATENT DOCUMENTS

| | | | | |
|---|---|---|---|---|
| 7,671,482 | B2 * | 3/2010 | Tighe | B60L 58/30 141/348 |
| 8,948,947 | B2 | 2/2015 | Takaku et al. | |
| 2017/0187056 | A1 * | 6/2017 | Kawaura | H01M 8/04082 |
| 2021/0123567 | A1 * | 4/2021 | Shim | B60L 53/00 |
| 2023/0304636 | A1 * | 9/2023 | Zoia | F17C 5/007 |

FOREIGN PATENT DOCUMENTS

| | | |
|---|---|---|
| JP | 4558357 B2 | 7/2010 |

OTHER PUBLICATIONS

Shiu Kit Tso, Ka Lun Fan, Yongde Zhang and Chun Man Chan, “An automated gas station attendant,” in IEEE Intelligent Systems, vol. 17, No. 2, pp. 84-87, Mar.-Apr. 2002 (Year: 2002).*

Mostafa, SM G., et al. “Design and Implementation of a Data-Driven Fuel Management System.” 2022 4th International Conference on Sustainable Technologies for Industry 4.0 (STI). IEEE, 2022. (Year: 2022).*

* cited by examiner

*Primary Examiner* — Russell Frejd
*Assistant Examiner* — Ana D Thomas
(74) *Attorney, Agent, or Firm* — MORGAN, LEWIS & BOCKIUS LLP

(57) ABSTRACT

A fuel refueling apparatus includes a support plate, a connector protruding from the support plate and configured to be coupled to a dispenser of a refueling station to refuel fuel, a detection sensor which is configured to detect the dispenser coupled to the connector, and a signal transmitter configured to transmit a signal to the refueling station based on that the dispenser is detected by the detection sensor.

17 Claims, 11 Drawing Sheets

FUEL REFUELING APPARATUS AND FUEL REFUELING TRANSMISSION METHOD

CROSS-REFERENCE TO RELATED APPLICATION

The present application claims priority to Korean Patent Application No. 10-2023-0181250, filed on Dec. 13, 2023, and Korean Patent Application No. 10-2024-0006180, filed on Jan. 15, 2024, the entire contents of which is incorporated herein for all purposes by this reference.

BACKGROUND OF THE PRESENT DISCLOSURE

Field of the Present Disclosure

The present disclosure relates to a fuel refueling apparatus and a fuel refueling transmission method.

DESCRIPTION OF RELATED ART

Recently, as awareness of crisis of the environments and the depletion of petroleum resources has increased, research and development on hydrogen fuel cell vehicles that are eco-friendly vehicles has been highlighted.

A hydrogen fuel cell vehicle is a vehicle that utilizes fuel cells that use hydrogen as fuel. The hydrogen fuel cell vehicle may be driven by power which is obtained by a reaction of stored hydrogen and oxygen. For the present reason, the hydrogen fuel cell vehicle needs to be refueled with hydrogen from a refueling station.

The hydrogen fuel cell vehicle may include a connector to be coupled to a dispenser of the refueling station. Accordingly, when the hydrogen fuel cell vehicle is refueled with hydrogen from the dispenser of the refueling station, the hydrogen fuel cell vehicle and the refueling station need to transmit and receive information. When the hydrogen fuel cell vehicle is ready for refueling of hydrogen from the dispenser of the refueling station, it transmits information to the refueling station, and the refueling station receives the information from the hydrogen fuel cell vehicle.

Accordingly, a need for a fuel refueling apparatus and a fuel refueling transmission method for allowing the hydrogen fuel cell vehicle to transmit information to the refueling station at a more precise moment is increasing.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel refueling apparatus and a fuel refueling transmission method, by which a signal is transmitted to a refueling station as a dispenser of the refueling station is coupled to a connector of the hydrogen fuel cell vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a fuel refueling apparatus includes a support plate, a connector protruding from the support plate and configured to be coupled to a dispenser of a refueling station to refuel fuel, a detection sensor which is configured to detect the dispenser coupled to the connector, and a signal transmitter configured to transmit a signal to the refueling station based on that the dispenser is detected by the detection sensor.

The detection sensor may be mounted on the support plate, and may be configured to detect the dispenser while contacting with the dispenser on a radially external side of the connector.

When a direction, in which the connector and the detection sensor protrude from the support plate, is a forward direction, a front end portion of the detection sensor is located in a forward direction of a front end portion of the connector.

The fuel refueling apparatus may further include a housing member including an internal space, in which the support plate, the connector, the detection sensor, and the signal transmitter are accommodated, together with the support plate, and the detection sensor may be mounted on the housing member and may be configured to detect the dispenser.

The detection sensor may detect the dispenser while being pressed by the dispenser or may detect the dispenser while being spaced apart from the dispenser.

The fuel refueling apparatus may further include a housing member including an internal space, in which the support plate, the connector, the detection sensor, and the signal transmitter are accommodated, together with the support plate, and a lid rotatably coupled to the housing member to open or close the internal space to or from an outside, and the detection sensor may be configured to detect the lid closing the internal space.

The signal transmitter may be provided in the support plate.

The fuel refueling apparatus may further include a processor operatively connected to the detection sensor and the signal transmitter. The processor may be configured for identifying a driving state condition of a vehicle including the connector, and transmitting the signal to the refueling station in response that the driving state condition of the vehicle is satisfied.

In the identifying of the driving state condition of the vehicle, the processor may be configured to perform at least one of determining whether a start of the vehicle is switched off, determining whether a gear of the vehicle is a parking (P) condition and determining whether a driving speed of the vehicle is a predetermined speed or less than the predetermined speed.

The processor may further be configured for preventing the start of the vehicle from being switched on in response to the detecting of the dispenser coupled to the connector.

The fuel refueling apparatus may further a housing member including an internal space, in which the support plate, the connector, the detection sensor, and the signal transmitter are accommodated, together with the support plate and a lid rotatably connected to the housing member and configured to open or close the internal space. The processor may further be configured for detecting the lid and transmitting the signal to the refueling station in response to not detecting the lid.

According to another aspect of the present disclosure, a fuel refueling transmission method using a vehicle including a connector and a refueling station including a dispenser, and the connector which is coupled to the dispenser includes detecting, by a detection sensor, the dispenser coupled to the connector, identifying, by a processor operatively connected to the detection sensor, a driving state condition of the vehicle, and transmitting, by the processor, a signal to the refueling station in response that the driving state condition of the vehicle is satisfied.

The identifying of the driving state condition of the vehicle may include determining whether a start of the vehicle is switched off.

The identifying of the driving state condition of the vehicle may include determining whether a gear of the vehicle is a parking (P) condition.

The identifying of the driving state condition of the vehicle may include determining whether a driving speed of the vehicle is a predetermined speed or less than the predetermined speed.

The fuel refueling transmission method may further include preventing the start of the vehicle from being switched on in response to detecting the dispenser coupled to the connector.

The fuel refueling transmission method may further include detecting a lid that is rotatably coupled to the connector and configured to open or close an internal space, in which the connector is accommodated, to or from an outside, and transmitting a signal to the refueling station in response to not detecting the lid.

The fuel refueling transmission method may further include providing a notification that the dispenser is not detected, to a user in response to not detecting the dispenser, and providing a notification that the driving state condition of the vehicle is not satisfied, to the user when the driving state condition of the vehicle is not satisfied.

The fuel refueling transmission method may further include providing a notification that the lid is not detected, to a user in response that the lid is not detected.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
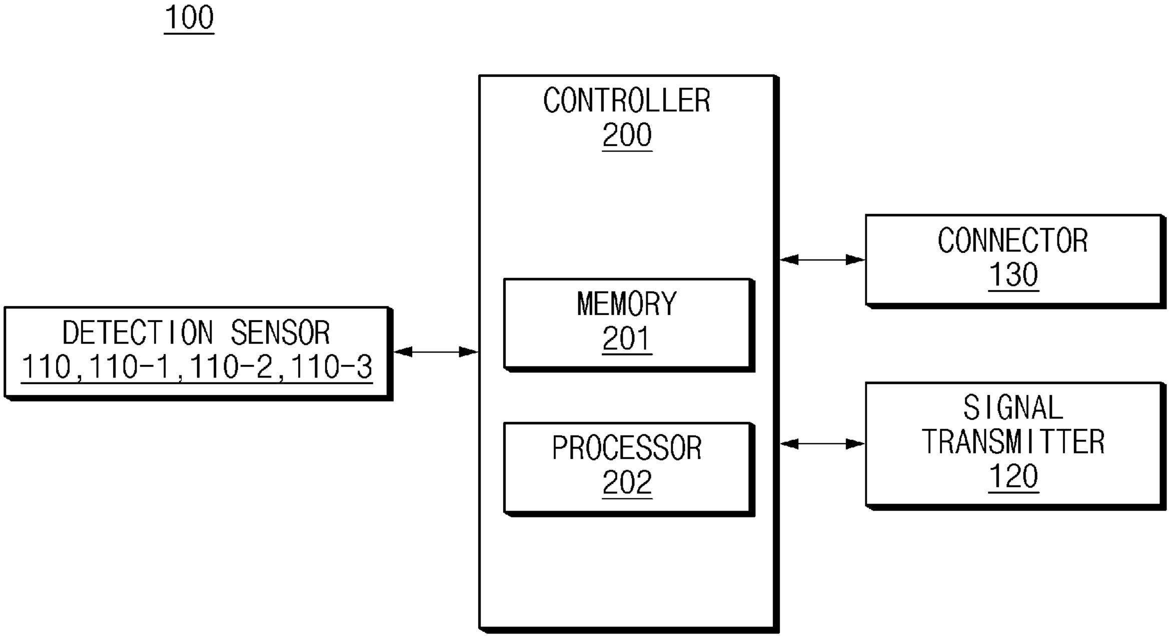
FIG. 1 is a block diagram of a fuel refueling apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the appended drawings so that those skilled in the art may easily implement the present disclosure. When adding reference numerals to components in each drawing, it should be noted that identical components are provided the same reference numerals as much as possible even if they are shown in different drawings. Additionally, in describing embodiments of the present disclosure, when it is determined that detailed descriptions of related known configurations or functions may impede understanding of the exemplary embodiments of the present disclosure, detailed descriptions thereof will be omitted.

Furthermore, in describing the components of the exemplary embodiments of the present disclosure, terms, such as first, second, “A”, “B”, (a), and (b) may be used. The terms are simply for distinguishing the components, and the essence, the sequence, and the order of the corresponding components are not limited by the terms. Unless defined differently, all the terms including technical or scientific terms include the same meanings as those generally understood by an ordinary person in the art, to which the present disclosure pertains. The terms, such as the terms defined in dictionaries, which are generally used, should be construed to coincide with the context meanings of the related technologies, and are not construed as ideal or excessively formal meanings unless explicitly defined in an exemplary embodiment of the present disclosure.

Hereinafter, referring to FIGS. 1 to 11, various exemplary embodiments of the present disclosure will be described in detail.

FIG. 1 is a block diagram of a fuel refueling apparatus according to an exemplary embodiment of the present disclosure.

Referring to FIG. 1, the fuel refueling apparatus 100 may be an apparatus which is provided in a fuel cell electric vehicle (FCEV). The fuel cell electric vehicle (hereinafter, referred to as 'vehicle') needs to refuel hydrogen (hereinafter referred to as 'fuel') in a storage tank that stores hydrogen that reacts with air.

To the present end, the vehicle may receive fuel from a dispenser 160 of the refueling station (see FIG. 2) and may store the fuel in the storage tank. Meanwhile, a refueling method and a refueling procedure of the vehicle and the refueling station may follow international standards.

When the vehicle is ready for refueling, it may transmit a signal that indicating a readiness for transmission to the refueling station, and accordingly, the refueling station may supply fuel to the vehicle through the dispenser 160.

When the vehicle is ready for refueling, the signal transmitted to the refueling station may be an infrared signal according to the procedure in accordance with SAE J2799 issued by the Society of Automotive Engineers (SAE).

Hereinafter, the fuel refueling apparatus 100 for sending an infrared signal to the refueling station for a vehicle to receive the fuel will be described according to an exemplary embodiment of the present disclosure.

The fuel refueling apparatus 100 may include a connector 130 formed to be coupled to the dispenser 160, and detection sensors 110, 110-1, 110-2, and 110-3 which is configured to detect the dispenser 160 coupled to the connector 130.

The fuel refueling apparatus 100 may include a signal transmitter 120 which is formed to transmit a signal to the refueling station. The signal transmitter 120 may transmit infrared rays. The signal transmitter 120 may communicate with thee refueling station through infrared rays. The signal transmitter 120 may satisfy the SAE J2799 standard.

Based on that the dispenser 160 coupled to the connector 130 is detected by the detection sensor 110, 110-1, 110-2, and 110-3, the signal transmitter 120 may transmit an infrared signal to the refueling station.

The fuel refueling apparatus 100 may include a controller 200. The controller 200 may include a memory 201 and a processor 202. The memory 201 may include volatile memories, such as a static random access memory (S-RAM) and a dynamic random access memory (D-RAM), for temporarily storing data while electric power is supplied, non-volatile memories, such as a read only memory (ROM) and an erasable programmable read only memory (EPROM), for preserving data even when supply of electric power is interrupted.

The processor 202 may include various logic circuits and operation circuits, may be configured for processing data according to a program provided from the memory 201, and may be configured to generate control signals according to the processing results.

When the detection sensor 110, 110-1, 110-2, and 110-3 detects the dispenser 160 coupled to the connector 130, the processor 202 may be configured for controlling the signal transmitter 120 so that the signal transmitter 120 transmits an infrared signal to the refueling station.

According to the configuration, after a specific time period after a lid 105 opens an internal space 102 (see FIG. 3, or the like.) that will be described later, in which the connector 130 is accommodated, the signal transmitter 120 may transmit an infrared signal to the refueling station at a moment when an intention of the user for refueling is clearer through the dispenser 160 than when an infrared signal is transmitted to the refueling station.

Even when the signal transmitter 120 transmits an infrared signal after a specific time period after the lid 105 opens the internal space 102, the user may not immediately refuel the fuel to the vehicle due to other reasons. As compared to these cases, according to an exemplary embodiment of the present disclosure, an infrared signal may be transmitted at a more precise moment, a refueling start point may be more clearly distinguished.

Furthermore, even when the vehicle is provided with a plurality of connectors 130, it is possible to prevent the dispenser 160 that cannot be coupled to the connector 130 from approaching and transmitting an infrared signal whereby power consumption may be prevented.

Furthermore, when the vehicle is provided with the plurality of connectors 130, the signal transmitter 120 may transmit an infrared signal in correspondence to the dispenser 160 coupled to each of the connectors 130.

Accordingly, the signal transmitter 120 may transmit an infrared signal to the refueling station through a simpler procedure without a separate refueling preparation switch and a lid sensor which is configured to detect the lid 105 (see FIG. 5), and thus, may immediately transmit information on a readiness for refueling to the refueling station.

Figure 2:
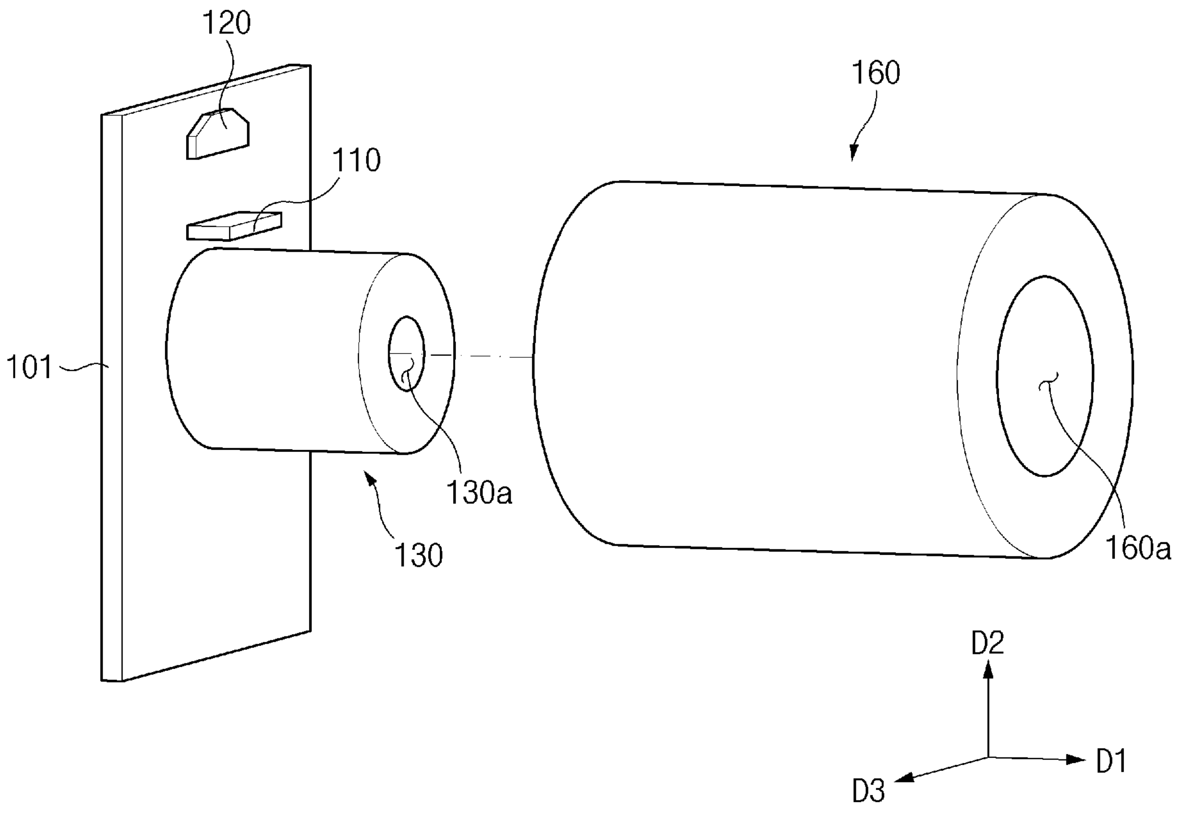
FIG. 2 is a schematic view of a fuel refueling apparatus and a dispenser according to an exemplary embodiment of the present disclosure.

FIG. 2 is a schematic view of the fuel refueling apparatus and the dispenser according to an exemplary embodiment of the present disclosure.

Referring to FIG. 2, the fuel refueling apparatus 100 (see FIG. 1) may include a support plate 101 that extends in a second direction D2 and a third direction D3 that are perpendicular to a first direction D1 that faces a front side, and a connector 130 that protrudes from the support plate 101 toward the first direction D1. Here, the third direction D3 may be perpendicular to the first direction D1 and the second direction D2.

As described above, the connector 130 may be configured to be coupled to the dispenser 160 of the refueling station to refueling the fuel. The connector 130 may define a supply hole 130*a* for supplying the fuel therein. An external circumference and an internal circumference of the connector 130 may be formed in a cylindrical shape.

The dispenser 160 may define a dispenser hole 160*a*, into which an external circumference of the connector 130 is inserted, in an interior thereof. The dispenser 160 may be completely coupled to the connector 130 as the connector 130 is inserted into the dispenser hole 160*a*.

Although not separately illustrated in the drawings, the connector 130 and the dispenser 160 may include a separate coupling structure for securing the coupling thereof.

The fuel refueling apparatus 100 may include a detection sensor 110 which is mounted on the support plate 101 to detect the dispenser 160 coupled to the connector 130. The detection sensor 110 is disposed on a radially external side of the connector 130 to detect the dispenser 160. The detection sensor 110 may be provided as a contact type sensor which is configured to detect the dispenser 160 while contacting with the dispenser 160 and a non-contact type sensor which is configured to detect the dispenser 160 while being spaced apart from the dispenser 160.

In relation to the contact type sensor, the detection sensor 110 may be provided as a pressure sensor using a resistive film or an electrostatic sensor using capacitance. As the dispenser 160 is coupled to the connector 130, it may be configured at a position, in which it is pressed by the dispenser 160. The position, in which the detection sensor 110 is pressed, may be between the connector 130 and the signal transmitter 120. Accordingly, the detection sensor 110 may be pressed by the dispenser 160 to detect the dispenser 160.

In relation to the non-contact type sensor, the detection sensor 110 may be provided as an inductive proximity sensor which is configured to detect changes in surrounding magnetic fields when the dispenser 160 is close, a capacitive proximity sensor which is configured to detect the dispenser 160 by measuring changes in capacitances of the dispenser 160, an ultrasonic proximity sensor that emits ultrasonic waves to the dispenser 160 to use the reflected ultrasonic waves, and an optical proximity sensor that radiates light, such as infrared light, to the dispenser 160 to use the reflected light.

Like this, the detection sensor 110 is provided as any one of a pressure sensor which is pressed by the dispenser 160 to detect a pressure of the dispenser 160, or a proximity sensor which is configured to detect the dispenser 160 while not contacting with the dispenser 160.

However, the detection sensor 110 is not limited to the above-mentioned types, and it is sufficient as long as it may detect the dispenser 160.

The fuel refueling apparatus 100 may include the signal transmitter 120 which is provided in the support plate 101 and transmits an infrared ray signal in the first direction D1 toward the refueling station when the detection sensor 110 detects the dispenser 160.

According to the structure, when the dispenser 160 is coupled to the connector 130 on a radially external side, the detection sensor 110 which is configured to detect the dispenser 160 may transmit an electrical signal to the processor 202 (see FIG. 1). The processor 202 may receive the electrical signal and may be configured for controlling the signal transmitter 120 to transmit an infrared signal that indicates that refueling to the refueling station is ready.

In the case of FIG. 2, unlike a structure that will be described later, the structure may not be provided with an internal space and a lid structure.

Figure 3:
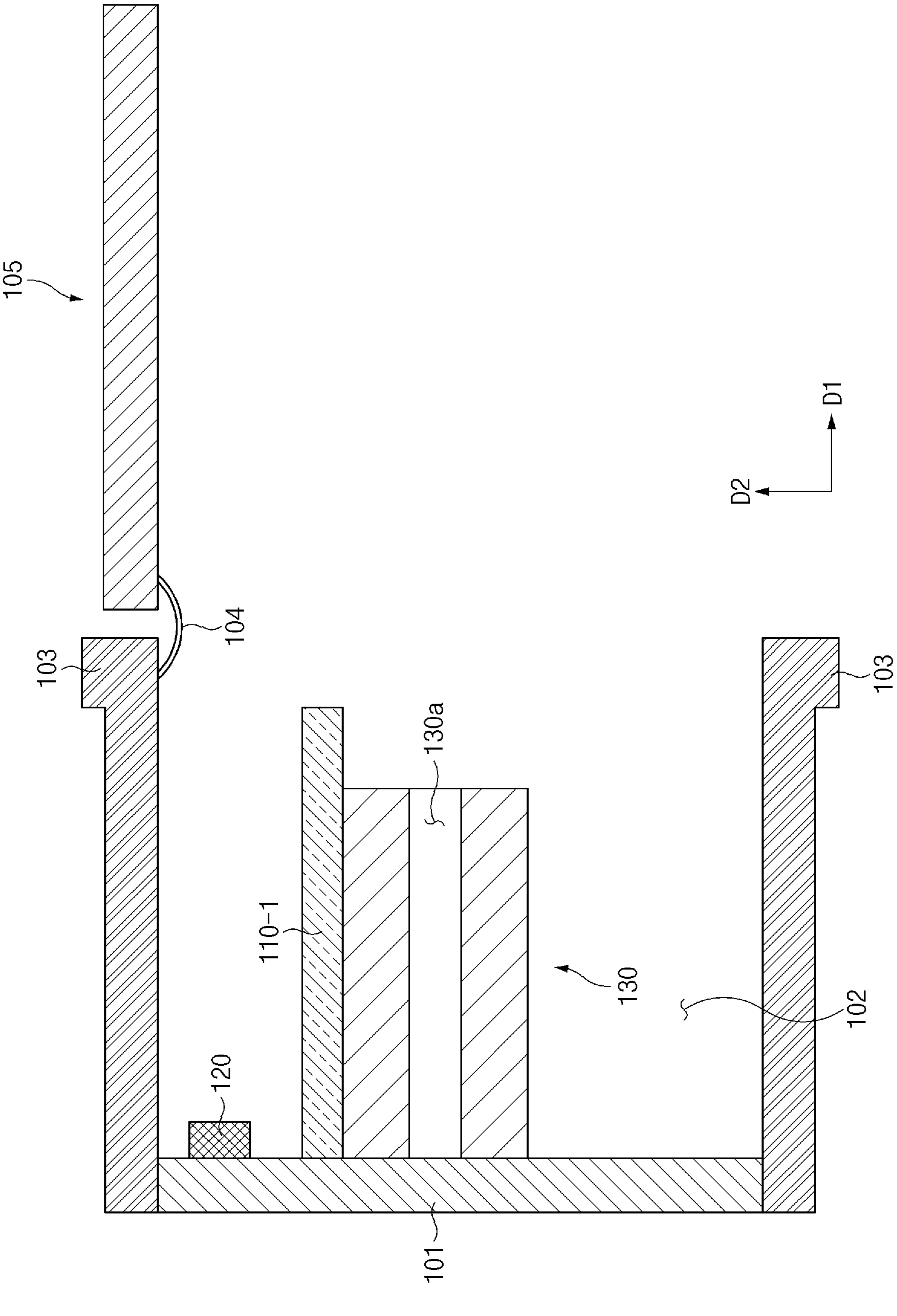
FIG. 3 is a longitudinal cross-sectional view of a fuel refueling apparatus in a state, in which a lid opens an internal space, according to another exemplary embodiment of the present disclosure.
Figure 4:
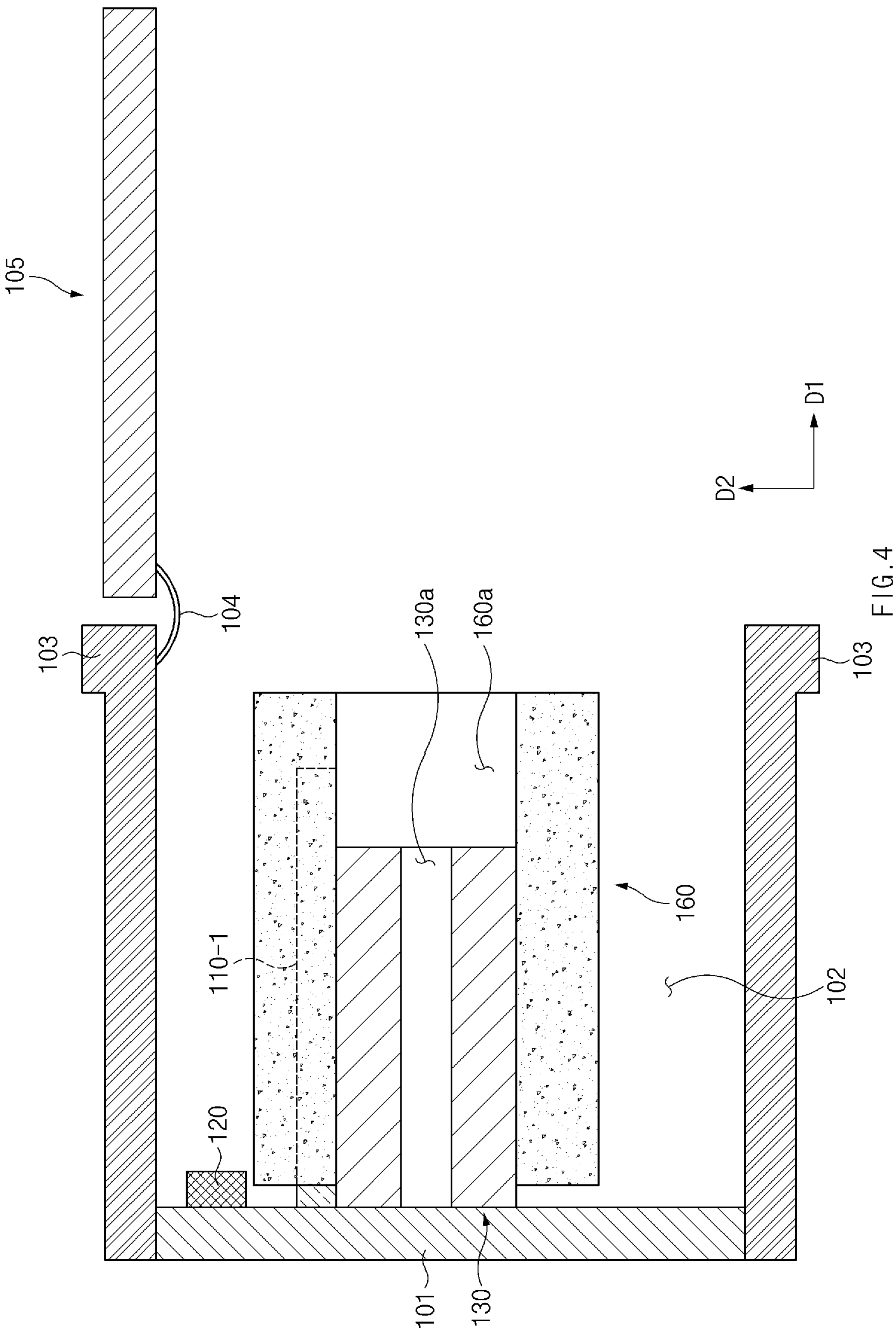
FIG. 4 is a longitudinal cross-sectional view of a dispenser coupled to a connector illustrated in FIG. 3.
Figure 5:
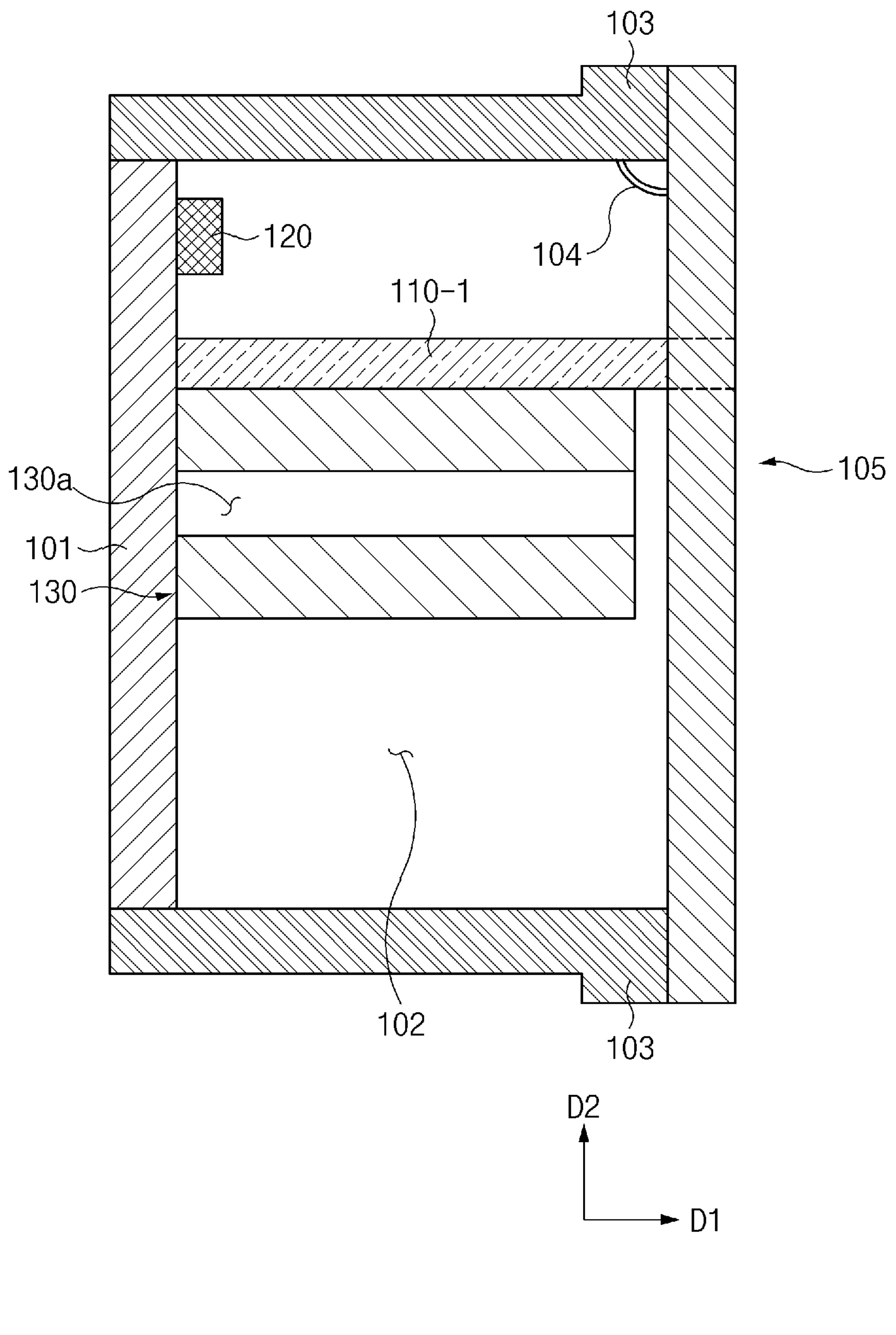
FIG. 5 is a longitudinal cross-sectional view of a fuel refueling apparatus in a state, in which the lid illustrated in FIG. 3 closes the internal space.

FIG. 3 is a longitudinal cross-sectional view of a fuel refueling apparatus in a state, in which a lid opens an internal space, according to another exemplary embodiment of the present disclosure. FIG. 4 is a longitudinal cross-sectional view of a dispenser coupled to a connector illustrated in FIG. 3; FIG. 5 is a longitudinal cross-sectional view of the fuel refueling apparatus in a state, in which the lid illustrated in FIG. 3 closes the internal space.

Referring to FIG. 3, FIG. 4, and FIG. 5, the fuel refueling apparatus 100 (see FIG. 1) may include a connector 130 that protrudes from a support plate 101 in the first direction D1, and a detection sensor 110-1 and a signal transmitter 120 that are provided in the support plate 101.

The support plate 101, the connector 130, the detection sensor 110-1, and the signal transmitter 120 of the fuel refueling apparatus 100 may be accommodated in the internal space 102.

In other words, the fuel refueling apparatus 100 may include a housing member 103 that defines the internal space 102 which is a space which is opened or closed to or from an outside of the vehicle, together with the support plate 101.

The housing member 103 may protrude from the support plate 101 in the first direction D1 and may extend in a circumferential direction to define the internal space 102 therein.

The fuel refueling apparatus 100 may include a lid 105 which is configured to be rotatable with respect to the housing member 103 to open or close the internal space 102 to or from an outside thereof. The lid 105 may be rotatably coupled to the housing member 103 by a connecting member 104. When the lid 105 is rotated away from the housing member 103, the connecting member 104 may be extracted from the housing member 103, and when the lid 105 is rotated to be closer to the housing member 103, the connecting member 104 may be inserted into the housing member 103.

A size of the lid 105 may be greater than an area of the internal space 102 when the lid 105 is viewed in the first direction D1, and when the lid 105 is disposed to cover the internal space 102, the lid 105 may be fixed relative to the housing member 103. To fix a position of the lid 105, other areas of the lid 105 and the housing member 103 may be coupled to each other.

As illustrated in FIG. 3 and FIG. 4, the lid 105 may open the internal space 102 to the outside thereof, or as illustrated in FIG. 5, the lid 105 may close the internal space 102 from the outside.

Meanwhile, the detection sensor 110-1 may be formed to detect the dispenser 160 while contacting with the dispenser 160 on the radially external side of the connector 130. In more detail, the detection sensor 110-1 may be provided as a pressure sensor.

In other words, the detection sensor 110 illustrated in FIG. 2 may be disposed on the radially external side of the connector 130, and a front end portion of the detection sensor 110, which faces the first direction D1 may be disposed in an opposite direction to the first direction from the connector 130.

Unlike this, the detection sensor 110-1 illustrated in FIG. 3 may be disposed on the radially external side of the connector 130, and the front end portion of the detection sensor 110-1, which faces the first direction D1, may be disposed in the first direction D1 from the connector 130.

A length, by which the detection sensor 110-1 protrudes from the support plate 101, may be greater than a length, by which the connector 130 protrudes from the support plate 101.

In other words, the front end portion of the detection sensor 110-1 may be disposed to be located on a front side of the front end portion of the connector 130. The disposition of the detection sensor 110-1 may be a disposition for detecting the dispenser 160 which is moved toward the connector 130 for coupling to the connector 130.

When the dispenser 160 is inserted toward the internal space 102 and is moved toward the radially external side of the connector 130, the dispenser 160 may press the front end portion of the detection sensor 110-1 in an opposite direction (e.g., the rearward direction) to the first direction D1, and accordingly, the signal transmitter 120 may transmit an infrared signal in the first direction D1.

The detection sensor 110-1 may detect not only the dispenser 160 but also the lid 105. When the lid 105 closes the internal space 102 from the outside, the detection sensor 110-1 may detect the lid 105. That is, the detection sensor 110-1 may be configured to detect the lid 105 that closes the internal space 102.

That is, when the lid 105 is rotated with respect to the housing member 103 to close the internal space 102, the lid 105 may press the front end portion of the detection sensor 110-1 in the opposite direction (e.g., a rearward direction) of the first direction D1.

When the detection sensor 110-1 is pressed by the dispenser 160 and when the detection sensor 110-1 is pressed by the lid 105, the pressures, at which the detection sensor 110-1 is pressed, may be different, and accordingly, the detection sensor 110-1 may identify and detect the dispenser 160 and the lid 105.

In more detail, the detection sensor 110-1 may be pressed with a relatively high pressure by the dispenser 160, and the detection sensor 110-1 may be pressed with a relatively low pressure by the lid 105. However, the present disclosure is not limited thereto, and the detection sensor 110-1 may be pressed with a relatively low pressure by the dispenser 160, and the detection sensor 110-1 may be pressed with a relatively high pressure by the lid 105.

According to an exemplary embodiment of the present disclosure, the processor 202 (see FIG. 1) may be configured for controlling the signal transmitter 120 to detect an infrared ray signal based on the detection sensor 110-1 that detects the dispenser 160 while not detecting the lid 105.

Figure 6:
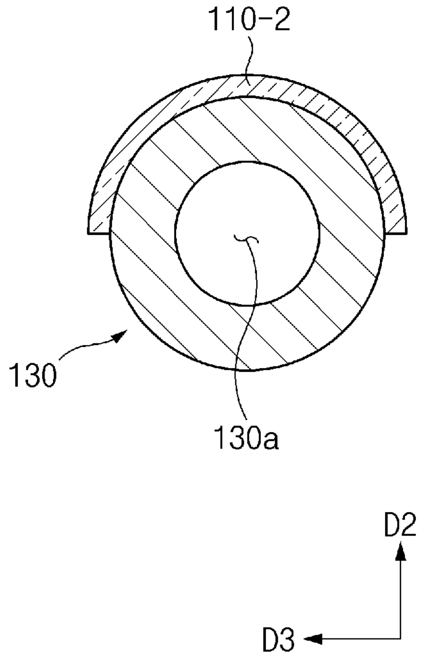
FIG. 6 is a schematic view of a longitudinal cross-sectional view of a connector and a detection sensor of a fuel refueling apparatus according to another exemplary embodiment of the present disclosure, when viewed from a front side.

FIG. 6 is a schematic view of a longitudinal cross-sectional view of a connector and a detection sensor of a fuel refueling apparatus according to another exemplary embodiment of the present disclosure, when viewed from a front side thereof.

Referring to FIG. 6, the connector 130 of the fuel refueling apparatus 100 (see FIG. 1) may be configured to define a supply hole 130*a* in an interior thereof. The connector 130 may extend in a circumferential direction to surround a supply hole 130*a* which is a circular hole, and an external circumference thereof may be formed in a cylindrical shape.

Accordingly, the detection sensor 110-2 may be formed in a shape that extends from a radially external side of the connector 130 along a circumferential direction of the connector 130. In the present way, the detection sensor 110-2 may be provided in a shape that extends along a semicircle when viewed from a front side, or may be provided in a shape that extends along a circle.

Even in the present structure, the detection sensor 110-2 may be provided as a pressure sensor and may be configured to detect the dispenser 160 (see FIG. 4).

The detection sensor 110-2 may extend in the circumferential direction of the connector 130, and a front end portion of the detection sensor 110-2, which facing the first direction D1 may be disposed in the first direction D1 or the opposite direction to the first direction from the connector 130. For configurations not described in relation to FIG. 6, the structure of FIG. 3 and FIG. 4 is used.

Figure 7:
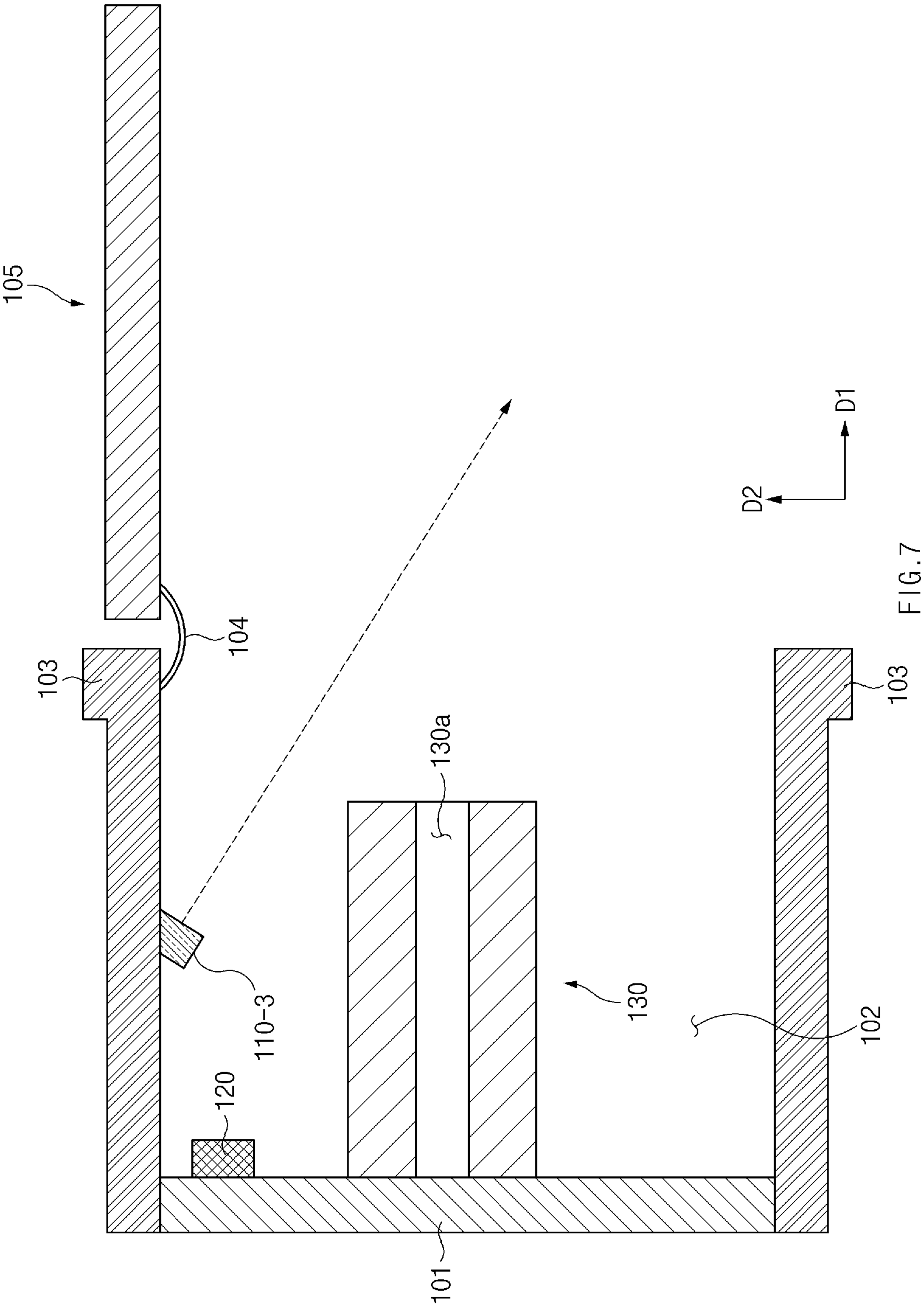
FIG. 7 is a longitudinal cross-sectional view of a fuel refueling apparatus in a state, in which a lid opens an internal space, according to another exemplary embodiment of the present disclosure.
Figure 8:
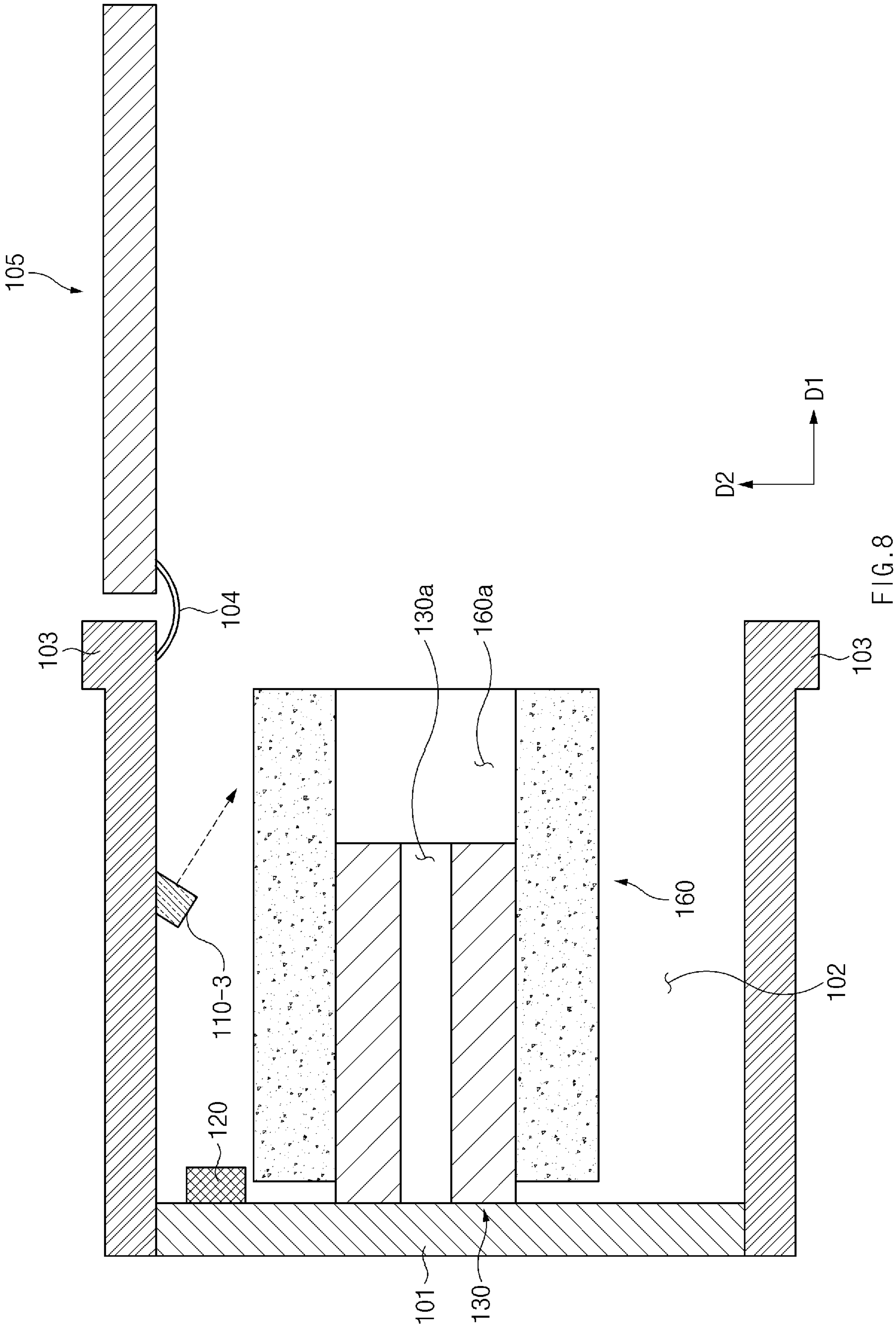
FIG. 8 is a longitudinal cross-sectional view of a state, in which a dispenser is coupled to a connector illustrated in FIG. 7.
Figure 9:
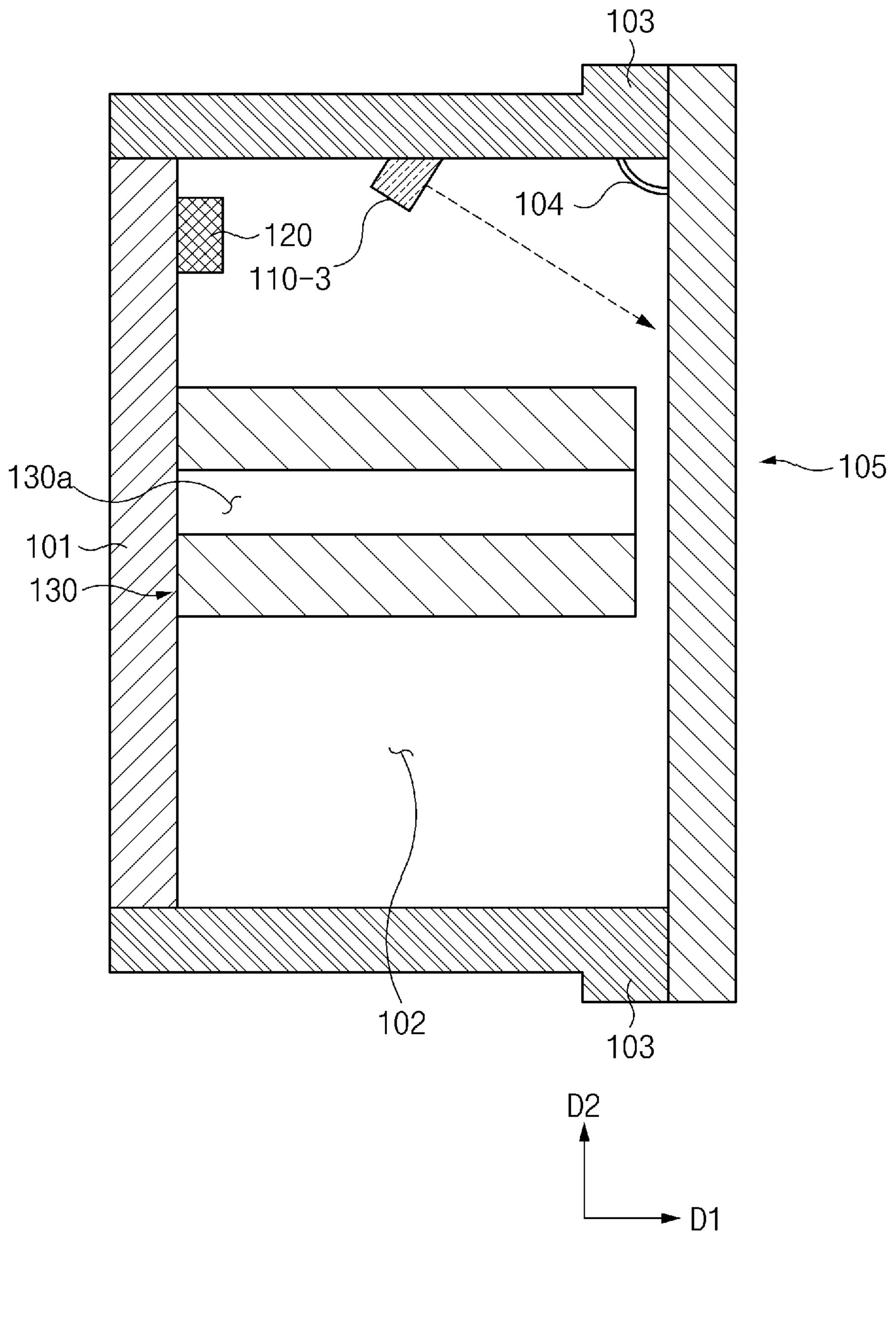
FIG. 9 is a longitudinal cross-sectional view of a fuel refueling apparatus in a state, in which the lid illustrated in FIG. 7 closes the internal space.

FIG. 7 is a longitudinal cross-sectional view of a fuel refueling apparatus in a state, in which a lid opens an internal space, according to another exemplary embodiment of the present disclosure. FIG. 8 is a longitudinal cross-sectional view of a state, in which a dispenser is coupled to a connector illustrated in FIG. 7. FIG. 9 is a longitudinal cross-sectional view of a fuel refueling apparatus in a state, in which the lid illustrated in FIG. 7 closes the internal space.

Referring to FIGS. 7 to 9, unlike the detection sensor 110-2 of FIG. 3, FIG. 4, and FIG. 5, the detection sensor 110-3 may be mounted on the housing member 103. Accordingly, the detection sensor 110-3 may be a non-contact type detection sensor.

The detection sensor 110-3 may be mounted on an internal surface of the housing member 103, which faces the internal space 102. The detection sensor 110-3 may be configured to irradiate ultrasonic waves or light toward the first direction D1 of the connector 130.

In more detail, as illustrated in FIG. 7, in a state, in which the lid 105 opens the internal space 102, a time period which is taken for the detection sensor 110-3 not to detect the ultrasonic waves or the light which is irradiated toward the first direction D1 and reflected, or to detect the reflected ultrasound or light may be relatively long.

On the other hand, as illustrated in FIG. 8, in a state, in which the dispenser 160 is inserted into the internal space 102 and coupled to the connector 130, a time period which is taken for the detection sensor 110-3 to detect the ultrasonic waves or light which is irradiated toward the first direction D1 of the connector 130 and reflected may be less than that in FIG. 7. This is because part of the ultrasonic waves or light may be irradiated from the detection sensor 110-3, be reflected by the dispenser 160, and then face the detection sensor 110-3 again.

Furthermore, as illustrated in FIG. 9, the detection sensor 110-3 may detect the lid 105 rather than the dispenser 160. The lid 105 may be located on a side of the dispenser 160 coupled to the connector 130 in the first direction D1.

In a state, in which the lid 105 closes the internal space 102, a time period which is taken for the detection sensor 110-3 to detect the reflected ultrasonic waves or light which is irradiated toward the first direction D1 of the connector 130 and reflected may be smaller than a time period which is taken for the detection sensor 110-3 to detect the ultrasonic waves or light in FIG. 7 and may be greater than a time period which is taken for the detection sensor 110-3 to detect the ultrasonic waves or light in FIG. 8.

This is because part of the ultrasonic waves or light may be irradiated from the detection sensor 110-3, be reflected by the lid 105, and then face the detection sensor 110-3.

In the present way, according to a principle that the detection sensor 110-3 identifies an object by use of ultrasonic waves or light, the detection sensor 110-3 may identify the lid 105 or the dispenser 160.

However, it is illustrated that the detection sensor 110-3 identifies an object by use of the ultrasonic waves or light while being supported by the housing member 103, but the present disclosure is not limited to this, and it may be provided as an inductive proximity sensor or a capacitive proximity sensor as described above.

According to an exemplary embodiment of the present disclosure, the processor 202 (see FIG. 1) may be configured for controlling the signal transmitter 120 to transmit an infrared ray signal based on that the detection sensor 110-3 detects the dispenser 160 while not detecting the lid 105.

Hereinafter, referring to FIG. 10, and FIG. 11, a flowchart of a fuel refueling transmission method using a vehicle including a refueling station including the dispenser 160 (see FIG. 4) and the connector 130 which is to be coupled to the dispenser 160 will be described.

Figure 10:
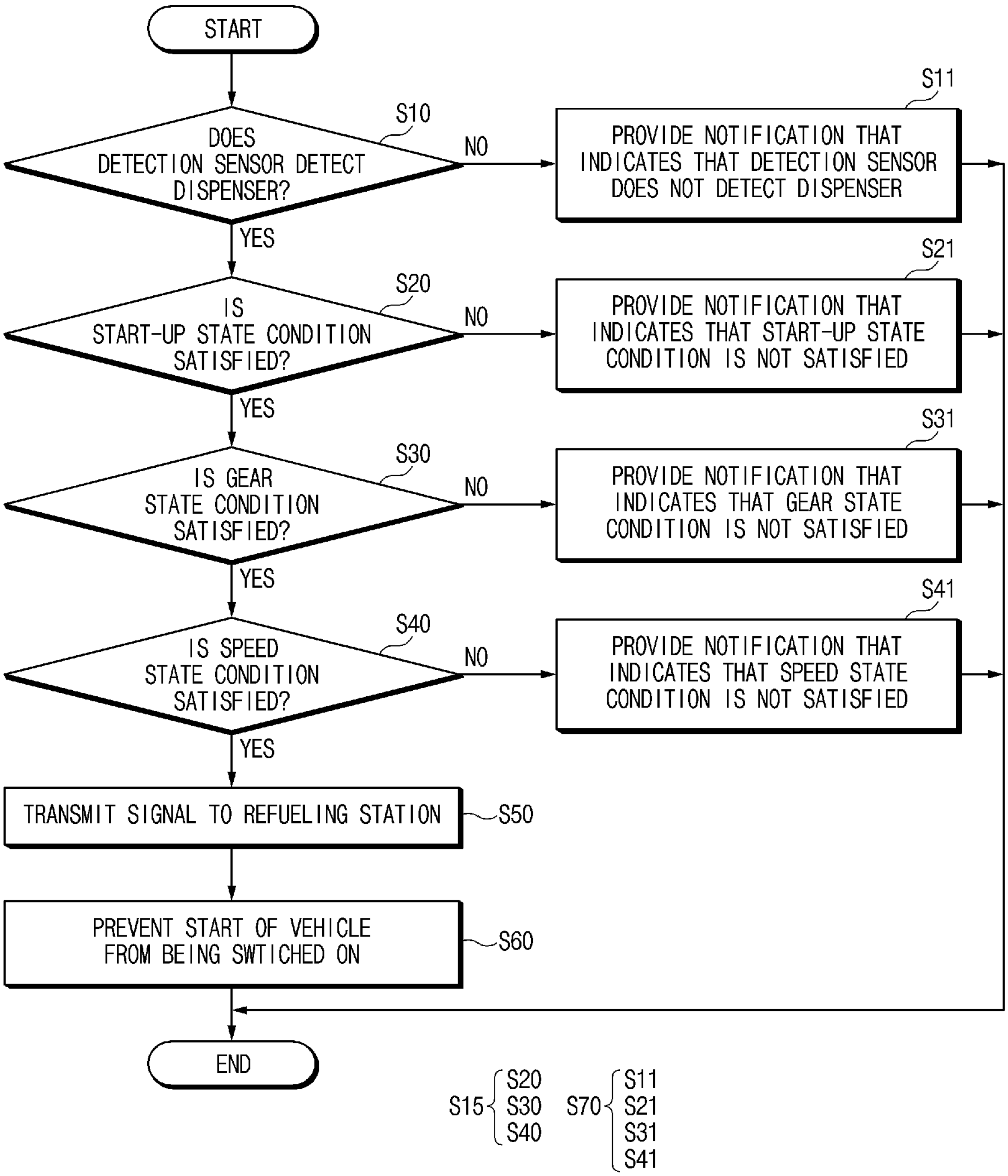
FIG. 10 is a flowchart according to a fuel refueling transmission method according to an exemplary embodiment of the present disclosure.

FIG. 10 is a flowchart according to a fuel refueling transmission method according to an exemplary embodiment of the present disclosure.

Referring to FIGS. 1 and 10, the fuel refueling transmission method may include an operation (S10) of the detection sensor 110, 110-1, 110-2, and 110-3 detecting the dispenser 160 (FIG. 4). Accordingly, the detection sensors 110, 110-1, 110-2, and 110-3 may detect the dispenser 160 coupled to the connector 130.

The fuel refueling transmission method may include an operation (S15) of identifying a driving state condition of the vehicle based on that the detection sensor 110, 110-1, 110-2, and 110-3 detects the dispenser 160. The operation (S15) of identifying the driving state condition of the vehicle may include an operation (S20) of identifying a start-up state condition of the vehicle, an operation (S30) of identifying a gear state condition of the vehicle, and an operation (S40) of identifying a speed state condition of the vehicle.

In other words, the fuel refueling transmission method may include an operation (S20) of identifying a start-up state condition of the vehicle when the detection sensor 110, 110-1, 110-2, and 110-3 detects the dispenser 160 (Yes in S10). Accordingly, the operation (S20) of identifying the start-up state condition of the vehicle may include an operation of determining whether a start of the vehicle ignition is off.

The fuel refueling transmission method may include an operation (S30) of determining whether the gear state condition of the vehicle is satisfied based on that the start-up state of the vehicle is an OFF state (Yes in S20). The gear state condition of the vehicle means an operation of determining whether a gear of the vehicle is in a "P" (a parking condition).

The fuel refueling transmission method may include an operation (S40) of determining whether the speed state condition of the vehicle is satisfied, based on that the gear state of the vehicle is "P" (Yes in S30). The speed state condition of the vehicle means an operation of determining whether the vehicle is in a condition, in which the speed of the vehicle is a specific speed or lower. Here, the specific speed may be a value in a range, in which it may be determined that the vehicle is stopped.

The fuel refueling transmission method may include an operation (S50) of transmitting an infrared signal that indicates completion of refueling to the refueling station, based on that the speed of the vehicle is the specific speed or lower (Yes in S40). Whether the vehicle is in the start-up condition, whether the gear state is in the "P" and whether the speed of the vehicle is the specific speed or lower, may be determined from a control unit provided separately from the controller 200. The control unit may transmit signal though CAN (Controller Area Network) to the controller 200. The controller 200 may determine whether the above-mentioned conditions are satisfied.

The fuel refueling transmission method may include an operation (S60) of preventing the start of the vehicle from being switched on after the infrared signal is transmitted to the refueling station. In other words, it is possible to prevent the start of the vehicle from being switched on after the vehicle transmits the infrared signal to the refueling station.

According to the transmission method, it is possible to detect the dispenser 160 while not determining whether the lid 105 (see FIG. 5) is opened and closed, and transmitting an infrared signal that indicates that the refueling to the refueling station is ready by determining only a driving state of the vehicle.

Accordingly, the refueling station may deliver the fuel through the dispenser 160 according to a specific procedure.

When the detection sensor 110, 110-1, 110-2, and 110-3 does not detect the dispenser 160 (No in S10), when the start-up state condition of the vehicle is not satisfied (No in S20), when the gear state condition of the vehicle is not satisfied (No in S30) or when the speed state condition of the vehicle is not satisfied (No in S40), the infrared signal may not be transmitted to the refueling station.

In more detail, the fuel refueling transmission method may include an operation (S70) of providing a notification to the user when the detection sensor 110, 110-1, 110-2, and 110-3 does not detect the dispenser 160 (No in S10) or when the driving state condition of the vehicle is not satisfied (No in S20, No in S30, or No in S40).

The operation (S70) of providing the notification to the user may include an operation (S11) of providing a notification that the dispenser 160 is not detected to the user when the detection sensors 110, 110-1, 110-2, and 110-3 does not detect the dispenser 160 (No in S10).

Furthermore, the operation (S70) of providing the notification to the user may include an operation (S21, S31, and S41) of providing a notification that the driving state condition of the vehicle is not satisfied to the user when the driving state condition of the vehicle is not satisfied (No in S20, No in S30, and No in S40).

In other words, the operation (S70) of providing notification to the user may include an operation (S21) of providing a notification that indicates that the start-up state condition of the vehicle is not satisfied to the user when the start-up state condition of the vehicle is not satisfied (No in FIG. 20), an operation (S31) of providing a notification that indicates that the gear state condition of the vehicle is not satisfied to the user when the gear state condition of the vehicle is not satisfied (No in FIG. 30), and an operation (S41) of providing a notification that indicates that the speed state condition of the vehicle is not satisfied to the user when the speed state condition of the vehicle is not satisfied (No in FIG. 40).

The information on the above-described notifications may be notified to the user through a dashboard or a cluster provided in the interior of the vehicle, and may be notified to the user through a terminal device of the user.

Figure 11:
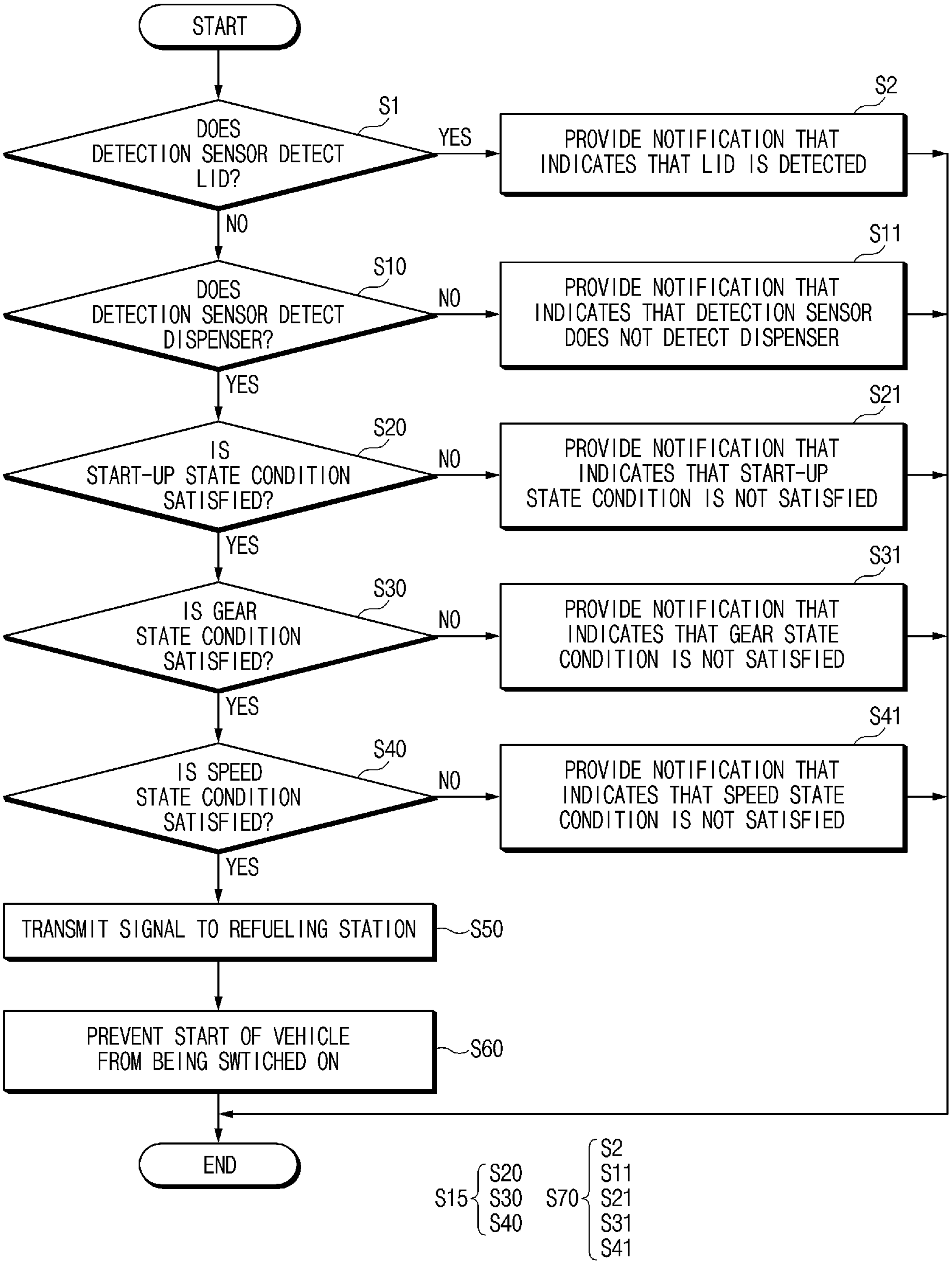
FIG. 11 is a flowchart according to a fuel refueling transmission method according to another exemplary embodiment of the present disclosure.

FIG. 11 is a flowchart according to a fuel refueling transmission method according to another exemplary embodiment of the present disclosure.

Referring to FIGS. 1 and 11, as compared to FIG. 10, the fuel refueling transmission method may include may further include an operation (S1) of the detection sensor 110, 110-1, 110-2, and 110-3 detecting the lid 105 (see FIG. 5).

In other words, the fuel refueling transmission method may include an operation (S1) of detecting the lid 105 for opening and closing the internal space 102, in which the connector 130 is accommodated, to or from the outside thereof.

The fuel refueling transmission method may include an operation (S10) of the detection sensor 110, 110-1, 110-2, and 110-3 (see FIG. 1) detecting the dispenser 160 when the lid 105 is not detected (No in S1).

Thereafter, the fuel refueling transmission method may include an operation (S15) of identifying the driving state condition of the vehicle when the lid 105 is not detected (No in S1) and the dispenser 160 is detected (Yes in S10). The operation (S15) of identifying the driving state condition of the vehicle may include an operation (S20) of identifying the start-up state condition of the vehicle, an operation (S30) of identifying the gear state condition of the vehicle, and an operation (S40) of identifying the speed state condition of the vehicle.

The description in FIG. 10 will be used for the operation (S20) of identifying the start-up state condition of the vehicle, the operation (S30) of identifying the gear state condition of the vehicle, and the operation (S40) of identifying the speed state condition of the vehicle.

The fuel refueling transmission method may include an operation (S50) of transmitting an infrared signal to the refueling station when the driving state condition of the vehicle is satisfied (Yes in S20, Yes in S30, and Yes in S40).

Thereafter, the fuel refueling transmission method may include an operation (S60) of preventing the start of the vehicle from being switched on.

According to the transmission method, an infrared ray signal may be transmitted to the refueling station when the lid 105 opens the internal space 102 and the lid 105 is not detected by the detection sensor 110, 110-1, 110-2, and 110-3) (No in S1), when the detection sensor 110, 110-1, 110-2, and 110-3 detects the dispenser 160 (Yes in S10), when the start-up state of the vehicle is an OFF state (Yes in S20), when the gear state of the vehicle is "P" (parking) (Yes S30), and when the speed of the vehicle is a specific speed or lower (Yes S40). Furthermore, the start of the vehicle may be prevented from being switched on later.

On the other hand, an infrared signal may not be transmitted to the refueling station when the detection sensor 110, 110-1, 110-2, and 110-3 detects the lid 105 (Yes in S1), when the detection sensor 110, 110-1, 110-2, and 110-3 does not detect the dispenser 160 (No in S10), when the start-up state of the vehicle is not an OFF state (No in S20), when the gear state of the vehicle is not "P" (parking) (No in S30), and when the speed of the vehicle is the specific speed or higher (No in S40).

In more detail, the fuel refueling transmission method may include an operation (S70) of providing a notification to the user when the detection sensor 110, 110-1, 110-2, and 110-3 detects the lid 105 (Yes in S1), when the detection sensor 110, 110-1, 110-2, and 110-3 does not detect the dispenser 160 (No in S10), when the driving state condition of the vehicle is not satisfied (No in S20, No in S30, and No in S40).

The operation (S70) of providing a notification to the user may include an operation (S2) of providing a notification that indicates that the lid 105 is detected to the user when the detection sensor 110, 110-1, 110-2, and 110-3 does detect the lid 105 (Yes in S1).

The operation (S70) of providing a notification to the user may include an operation (S11) of providing a notification that indicates that the dispenser 160 is not detected to the user when the detection sensor 110, 110-1, 110-2, and 110-3 does not detect the dispenser 160 (No in S10).

Furthermore, the operation (S70) of providing a notification to the user may include an operation (S21, S31, and S41) of providing a notification that indicates that the driving state condition of the vehicle is not satisfied when the driving state condition of the vehicle is not satisfied (No in S20, No in S30, and No in S40).

In other words, the operation (S70) of providing notification to the user may include an operation (S21) of providing a notification that indicates that the start-up state condition of the vehicle is not satisfied when the start-up state condition of the vehicle is not satisfied (No in S20), an operation (S31) of providing a notification that indicates that the gear state condition of the vehicle is not satisfied when the gear state condition of the vehicle is not satisfied (No in S30), and an operation (S41) of providing a notification that the speed state condition of the vehicle is not satisfied when the speed state condition of the vehicle is not satisfied (No of S40).

The information on the above-described notifications may be notified to the user through a dashboard or a cluster provided in the interior of the vehicle, and may be notified to the user through a terminal device of the user.

According to the present technology, a signal may be transmitted to the refueling station as the dispenser of the refueling station is coupled to the connector of the hydrogen fuel cell vehicle whereby a moment, at which the signal is transmitted, may be more precise and the transmission procedure may be simplified.

Furthermore, according to the present technology, because the sensor of the hydrogen fuel cell vehicle may detect the lid, the transmission procedure of the hydrogen fuel cell vehicle may be performed without a separate lid detection sensor.

Furthermore, various effects which may be directly or indirectly recognized through the present disclosure may be provided.

The above description is a simple exemplary description of the technical spirits of the present disclosure, and an ordinary person in the art, to which the present disclosure pertains, may make various corrections and modifications without departing from the essential characteristics of the present disclosure.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, unless stated otherwise, a singular expression includes a plural expression unless the context clearly indicates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel refueling apparatus comprising:

a support plate;

a connector protruding from the support plate and configured to be coupled to a dispenser of a refueling station to refuel fuel;

a detection sensor configured to detect the dispenser coupled to the connector;

a signal transmitter configured to transmit a signal to the refueling station in response that the dispenser is detected by the detection sensor;

a housing member including an internal space, in which the support plate, the connector, the detection sensor, and the signal transmitter are accommodated, together with the support plate;

a lid rotatably coupled to the housing member to open or close the internal space to or from an outside; and a processor operatively connected to the detection sensor and the signal transmitter, wherein the detection sensor is configured to detect the lid closing the internal space, and wherein the processor is configured for:

providing a notification that the lid is detected, to a user in response to detecting the lid; and providing the notification that the dispenser is not detected, to the user in response to not detecting the dispenser.

2. The fuel refueling apparatus of claim 1, wherein the detection sensor is mounted on the support plate, and is configured to detect the dispenser while contacting with the dispenser on a radially external side of the connector.

3. The fuel refueling apparatus of claim 1, wherein the connector and the detection sensor protrude from the support plate in a forward direction and a front end portion of the detection sensor is located in a forward direction of a front end portion of the connector.

4. The fuel refueling apparatus of claim 1, wherein the detection sensor is mounted on the housing member and is configured to detect the dispenser.

5. The fuel refueling apparatus of claim 1, wherein the detection sensor is configured to detect the dispenser while being pressed by the dispenser or to detect the dispenser while being spaced apart from the dispenser.

6. The fuel refueling apparatus of claim 1, wherein the signal transmitter is provided in the support plate.

7. The fuel refueling apparatus of claim 1, further including:

wherein the processor is configured for:

identifying a driving state condition of a vehicle including the connector; and transmitting the signal to the refueling station in response that the driving state condition of the vehicle is satisfied.

8. The fuel refueling apparatus of claim 7, wherein in the identifying of the driving state condition of the vehicle, the processor is configured to perform at least one of:

determining whether a start of the vehicle is switched off;

determining whether a gear of the vehicle is a parking (P) condition; and determining whether a driving speed of the vehicle is a predetermined speed or less than the predetermined speed.

9. The fuel refueling apparatus of claim 8, wherein the processor is further configured for:

preventing the start of the vehicle from being switched on in response to the detecting of the dispenser coupled to the connector.

10. The fuel refueling apparatus of claim 8, further including:

wherein the processor is further configured for:

transmitting the signal to the refueling station in response to not detecting the lid.

11. A fuel refueling transmission method using a vehicle including a connector and a refueling station including a dispenser, the connector configured to be coupled to the dispenser, the fuel refueling transmission method comprising:

detecting, by a detection sensor, the dispenser coupled to the connector;

identifying, by a processor operatively connected to the detection sensor, a driving state condition of the vehicle;

transmitting, by the processor, a signal to the refueling station, in response that the driving state condition of the vehicle is satisfied;

detecting a lid configured to open or close an internal space, in which the connector is accommodated, to or from an outside thereof;

providing a notification that the lid is detected, to a user in response that the lid is detected; and providing the notification that the dispenser is not detected, to the user in response to not detecting the dispenser.

12. The fuel refueling transmission method of claim 11, wherein the identifying of the driving state condition of the vehicle includes:

determining whether a start of the vehicle is switched off.

13. The fuel refueling transmission method of claim 12, further including:

preventing the start of the vehicle from being switched on in response to the detecting of the dispenser coupled to the connector.

14. The fuel refueling transmission method of claim 11, wherein the identifying of the driving state condition of the vehicle includes:

determining whether a gear of the vehicle is a parking (P) condition.

15. The fuel refueling transmission method of claim 11, wherein the identifying of the driving state condition of the vehicle includes:

determining whether a driving speed of the vehicle is a predetermined speed or less than the predetermined speed.

16. The fuel refueling transmission method of claim 11, further including:

transmitting the signal to the refueling station in response to not detecting the lid.

17. The fuel refueling transmission method of claim 11, further including:

providing a notification that the driving state condition of the vehicle is not satisfied, to the user when the driving state condition of the vehicle is not satisfied.

* * * * *